(12) United States Patent
Vallström et al.

(10) Patent No.: US 7,593,749 B2
(45) Date of Patent: Sep. 22, 2009

(54) METHOD AND RADIO TERMINAL EQUIPMENT ARRANGEMENT OF INDICATING INCOMING CONNECTION

(75) Inventors: Jari Vallström, Oulu (FI); Anne Elsilä, Oulu (FI); Sanna Raitanen, Oulu (FI); Harri Lilja, Oulunsalo (FI)

(73) Assignee: Nokia Corporation, Espoo (FI)

( * ) Notice: Subject to any disclaimer, the term of this patent is extended or adjusted under 35 U.S.C. 154(b) by 211 days.

(21) Appl. No.: 10/522,480

(22) PCT Filed: May 28, 2003

(86) PCT No.: PCT/FI03/00419

§ 371 (c)(1),
(2), (4) Date: Jan. 26, 2005

(87) PCT Pub. No.: WO2004/107786

PCT Pub. Date: Dec. 9, 2004

(65) Prior Publication Data

US 2005/0239469 A1 Oct. 27, 2005

(51) Int. Cl.
*H04M 1/20* (2006.01)
(52) U.S. Cl. ............... 455/550.1; 455/74.1; 455/92; 455/96; 455/41.2; 455/567; 455/552.1; 455/556.1; 370/328
(58) Field of Classification Search .......... 455/550.1, 455/74.1, 92, 95, 41.2, 567, 552.1, 556.1; 370/328
See application file for complete search history.

(56) References Cited

U.S. PATENT DOCUMENTS

| 6,477,117 | B1 * | 11/2002 | Narayanaswami et al. ... 368/251 |
| 6,714,233 | B2 * | 3/2004 | Chihara et al. ........... 348/14.02 |
| 7,110,535 | B2 * | 9/2006 | Bodley et al. ................ 379/430 |
| 2002/0068600 | A1 * | 6/2002 | Chihara et al. .............. 455/550 |
| 2002/0098878 | A1 * | 7/2002 | Mooney et al. .............. 455/569 |
| 2002/0137552 | A1 * | 9/2002 | Cannon et al. .............. 455/567 |
| 2003/0095521 | A1 * | 5/2003 | Haller et al. ................ 370/338 |
| 2003/0143952 | A1 * | 7/2003 | Haller et al. .................. 455/41 |
| 2003/0224808 | A1 * | 12/2003 | Bonta ......................... 455/463 |
| 2004/0053616 | A1 * | 3/2004 | Overtoom et al. ........... 455/445 |

FOREIGN PATENT DOCUMENTS

| EP | 0 840 465 A2 | 5/1998 |
| WO | WO 01/99392 A1 | 12/2001 |
| WO | WO 02/39600 A2 | 5/2002 |

* cited by examiner

*Primary Examiner*—Rafael Pérez-Gutiérrez
*Assistant Examiner*—Nimesh Patel
(74) *Attorney, Agent, or Firm*—Hollingsworth & Funk

(57) ABSTRACT

A method of indicating about an incoming connection and a radio terminal equipment arrangement including a cellular core unit having a control unit and one or more peripheral units is provided. The control unit is configured to indicate the incoming connection in one or more peripheral units but not in the cellular core unit, when the LPRF connection between the cellular core unit and the peripheral unit is available; and to indicate the incoming connection in the cellular core unit, when the LPRF connection between the cellular core unit and the peripheral unit is not available and to indicate the incoming connection in the peripheral unit, when the LPRF connection between the cellular core unit and the peripheral unit becomes available.

16 Claims, 3 Drawing Sheets

METHOD AND RADIO TERMINAL EQUIPMENT ARRANGEMENT OF INDICATING INCOMING CONNECTION

FIELD

The invention relates to a method of indicating an incoming connection and to a radio terminal equipment arrangement.

BACKGROUND

Mobile devices divided into several parts that are used in various combinations are being developed. So-called multipart radio terminals, for example, may include a very small cellular core unit and a number of optimized peripheral units. The peripheral units of the multipart radio terminals are optimized for specific tasks and all the peripheral units are connected to a core unit by low power radio frequency (LPRF) connections, such as Bluetooth connections. One of the peripheral units may be optimized for making basic phone calls and another peripheral unit may be optimized for messaging and browsing or for imaging and music, for example.

When a new connection is to be established to a multipart radio terminal the indication of the incoming connection is made in one or in all of the peripheral units. Preferably, calls cannot be made or answered by a core unit because it has no user interface or a very minimal user interface. It is typical that the core unit does not indicate any incoming calls or SMS (Short Message Service) messages. The calls are answered or the SMS messages are received in one of the peripheral units of the multipart radio terminal. One peripheral unit at a time may represent a default device where all incoming connections are routed. It is also possible that all the peripheral units are indicating the incoming connections and the user may accept the call or read the SMS message from any one of the peripheral units. Also, the incoming call indication settings, such as ringing tones, are set in each peripheral unit as desired.

A problem with this kind of indication of incoming connections arises if for some reason the LPRF connection between the core unit and the peripheral unit in which the incoming connection is to be indicated, is not available. This is possible in a situation where the peripheral unit has moved too far away from the core unit, for example. If the LPRF connection between the core unit and the peripheral unit is not available, it is possible that the user of the multipart radio terminal will not be alarmed about any incoming connections. If on the other hand, both the core unit and the peripheral units are set to inform about the incoming connections, the user-friendliness of the multipart radio terminal becomes very poor. It is extremely disturbing and stressful for the user if all the devices of the multipart radio terminal are ringing always at the same time, for example. Also, for usability reasons, it is not sensible that such a device that cannot be used to accept any calls always informs about incoming calls, for example.

BRIEF DESCRIPTION OF THE INVENTION

An object of the invention is to provide an improved method of indicating an incoming connection and an improved radio terminal equipment arrangement. According to an aspect of the invention, there is provided a radio terminal equipment arrangement comprising: a cellular core unit comprising a control unit for controlling the functions of the cellular core unit, the control unit being configured to communicate with a cellular network using a cellular connection, and to receive an incoming connection request from the cellular network; and one or more peripheral units being configured to communicate with the cellular core unit using a wireless low power radio frequency (LPRF) connection. The control unit of the cellular core unit is configured to indicate the incoming connection request in one or more peripheral units but not in the cellular core unit, when the LPRF connection between the cellular core unit and a peripheral unit is available; and the control unit of the cellular core unit is further configured to indicate the incoming connection request in the core unit, when the LPRF connection between the cellular core unit and the peripheral unit is not available, and to indicate the incoming connection request in the peripheral unit, when the LPRF connection between the cellular core unit and the peripheral unit becomes available.

According to another aspect of the invention, there is provided a method of indicating about an incoming connection in a radio terminal equipment arrangement comprising: a cellular core unit and one or more peripheral units, the cellular core unit communicating with one or more of the peripheral units using a wireless low power radio frequency (LPRF) connection, the method comprising: receiving an incoming connection request from a cellular network by the cellular core unit. The method further comprises: indicating the incoming connection request in one or more of the peripheral units but not in the cellular core unit, when the LPRF connection between the cellular core unit and one or more of the peripheral units is available; indicating about the incoming connection request in the cellular core unit, when the LPRF connection between the cellular core unit and the peripheral unit is not available; and indicating about the incoming connection request in the peripheral unit, when the LPRF connection between the cellular core unit and the peripheral unit becomes available.

Preferred embodiments of the invention are described in the dependent claims.

The method and system of the invention provide several advantages. In a preferred embodiment of the invention, the information about incoming connections is received even if the LPRF connection between the peripheral units and the core unit is not available. Further, the usability of the radio terminal equipment arrangement is improved.

LIST OF DRAWINGS

In the following, the invention will be described in greater detail with reference to the preferred embodiments and the accompanying drawings, in which FIG. 1 shows an example of a structure of a radio system and a radio terminal equipment arrangement according to an embodiment of the invention;

DESCRIPTION OF EMBODIMENTS

Figure 1:
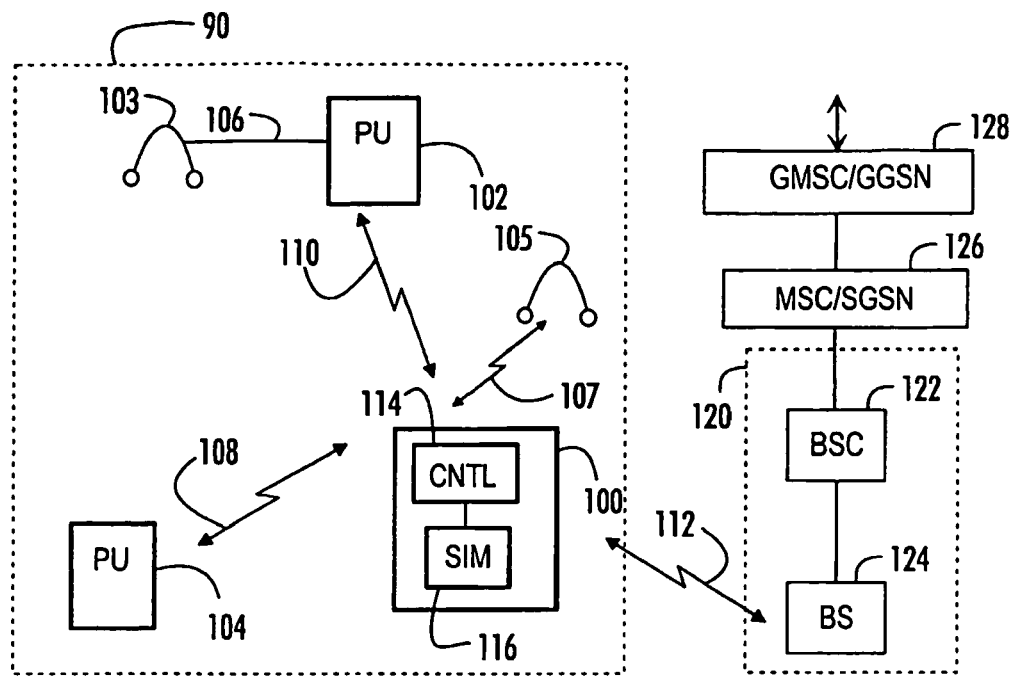

With reference to FIG. 1, let us examine an example of a structure of a radio system to which the preferred embodiments of the invention can be applied. The radio system can be based on, for example, the GSM (Global System for Mobile Communications), WCDMA (Wideband Code Division Multiple Access) or CDMA (Code Division Multiple Access). A radio terminal equipment arrangement 90 in FIG.

1 comprises a cellular core unit 100 and a number of optimized peripheral units 102, 104. The radio terminal equipment arrangement 90 is a multipart radio terminal, for example.

A cellular network may correspond to the combined structure of the GSM (Global System for Mobile Communications) and GPRS (General Packet Radio Service) systems, for example. The GSM network elements are responsible for the implementation of circuit-switched connections, and the GPRS network elements are responsible for the implementation of packet-switched connections, some of the network elements, however, being shared by both systems.

A centre 126 represents a mobile services switching centre (MSC) and a serving GPRS support node (SGSN) that enable circuit-switched and packet switched signalling, respectively, in the radio system. The cellular network may comprise a gateway unit 128, which is represented by a gateway mobile service switching centre (GMSC) and a gateway GPRS support node (GGSN). The GMSC attends to the circuit-switched connections between the cellular network and external networks, such as a public land mobile network (PLMN) or a public switched telephone network (PSTN), and the GGSN attends to the packet-switched connections between the cellular network and external networks such as the Internet.

The centre 126 controls a radio access network (RAN) 120, which may comprise at least one base station controller 122 controlling at least one base station 124. The base station controller 122 can also be called a radio network controller, and the base station 124 can be called node B. The cellular core unit 126 of the radio terminal equipment arrangement 90 communicates with at least one base station 124 over a radio interface.

The cellular core unit 100 of the radio terminal equipment arrangement 90 is a small cellular core unit without a display and minimal user interface parts, for example. Basic phone calls cannot be made or answered by the cellular core unit 100 alone, for example, because it lacks a user interface or the user interface part is very minimal. The cellular core unit 100 may be a "dummy black-box device", almost invisible to the user, and therefore it may not indicate incoming calls or SMS (Short Message Service) messages, for example. In practice, the cellular core unit 100 is placed in a user's handbag, belt or a pocket, for example.

The cellular core unit 100 comprises at least a control unit 114 for controlling the functions of the radio terminal equipment arrangement 90. The cellular core unit 100 may also comprise a SIM (Subscriber Identity Module) card 116 including a memory. The SIM card 116 is a smart card, also called a subscriber identification unit. Subscriber-specific identification data and authentication algorithms are stored therein permanently, and telephone numbers and short messages can be stored therein as variable data. The SIM card 116 identifies the cellular core unit 100 to the cellular network. The applications used in the radio terminal equipment arrangement 90 may be stored in the memory of the cellular core unit 100, in the SIM card 116 memory or in the peripheral units 102, 104. The applications that are in the peripheral units 102, 104 may also be used without a connection to the cellular core unit 100. During a connection to the cellular core unit 100, any changed data to the applications may then be synchronized with the cellular core unit 100. Such applications that can be synchronized between the peripheral units 102, 104 and the cellular core unit 100 may include a phonebook, a calendar, clock and date, an alarm clock, SMS message and MMS (Multimedia Messaging Service) message.

The peripheral units 102, 104 may also maintain their own memory databases that are not synchronized with the cellular core unit 100.

The peripheral units 102, 104 in the radio terminal equipment arrangement 90 are optimized for specific tasks. One of the peripheral units is optimized for making basic phone calls and another peripheral unit is optimized for messaging and browsing or for image processing and music, for example. Thus, a main feature of the peripheral unit 102, 104 may be something else than a basic voice call. It is also possible that the peripheral unit 102, 104 does not include voice call support at all. Such peripheral unit may be optimized only for music and messaging, for example. The users may store data to the peripheral unit's own databases. For example, a peripheral unit 102, 104 that is optimized for media applications may have a large memory for video and audio files that reside only in this particular peripheral unit. The peripheral units 102, 104 communicate with the cellular core unit 100 with low power radio frequency (LPRF) connections 108, 110, such as Bluetooth or WLAN connections. The cellular core unit 100, on the other hand, is configured to communicate with other systems, such as the Internet, with LPRF connections and with GSM/GPRS/EDGE connections 112 as well, for example.

The radio terminal equipment arrangement 90 may also comprise enhancement devices 103, 105, such as headsets for listening to music or for routing calls thereto. The enhancement devices 103, 105 may be connected to the peripheral units 102, 104 or to the cellular core unit 100 with galvanic or wireless connections 106, 107. The headset accessory may also include a camera, MP3 player and/or a radio.

In the radio system of FIG. 1, the peripheral units 102, 104 of the radio terminal equipment arrangement 90 may also be configured to establish outside. LPRF connections, such as WLAN (Wireless Local Area Network) connections via a WLAN Access Point to other systems, such as the Internet, for example. Also, the cellular core unit 100 can establish connections between the peripheral units 102, 104 and other systems, such as the Internet or other radio terminals, via the cellular network by using a GSM or a GPRS/EDGE connection 112, for example.

Typically, when there is no connection to the cellular core unit 100, the peripheral units 102, 104 cannot receive any calls or messages. An incoming connection, such as a call, can be established if the cellular core unit 100 and the peripheral unit 102, 104 are connected. If the LPRF connection 108, 110 between the cellular core unit 100 and the peripheral unit 102, 104 is lost during a call, the cellular core unit keeps the network connection on to the cellular network for a predetermined period of time. When the LPRF connection 108, 110 is available again then the call continues normally with or without any actions from the user. If the peripheral unit 102, 104 is not reconnected to the cellular core unit 100 during the predetermined time then the network connection to the cellular core unit 100 ends, and all calls, i.e. active and hold calls, are ended. When the call is active in a peripheral unit 102, for example, the call can be transferred to another peripheral unit 104.

In an embodiment of the invention, the control unit 114 of the cellular core unit 100 is configured to indicate the incoming connection request in one or more peripheral units 102, 104 but not in the cellular core unit 100, when the LPRF connection 108, 110 between the cellular core unit 100 and the peripheral unit 102, 104 is available. The control unit 114 of the cellular core unit 100 is further configured to indicate the incoming connection request in the cellular core unit 100, when the LPRF connection 108, 110 between the cellular core unit 100 and the peripheral unit 102, 104 is not available, and to indicate the incoming connection request in the peripheral unit 102, 104, when the LPRF connection 108, 110 between the cellular core unit 100 and the peripheral unit 102,104 becomes available.

Thus, when the cellular core unit 100 and the peripheral unit 108, 110 are connected, incoming calls are indicated in the peripheral unit 108, 110 and can be answered by the peripheral unit 108, 110. The cellular core unit 100 does not indicate the incoming call if the LPRF connection 108, 110 between the cellular core unit 100 and the peripheral unit 102, 104 is available. If more than one peripheral units 102, 104 are connected to the cellular core unit 100 then information about the incoming connection may be indicated in one or more peripheral units 102, 104. The call can be answered from any peripheral unit 102, 104. When the user answers the call from a certain peripheral unit 102, the audios are routed to that same peripheral unit 102. The call can also be transferred to another peripheral unit even after the call has already been answered.

If there are no peripheral units 102, 104 connected to the cellular core unit 100, then the cellular core unit 100 indicates the incoming call request by signalling with a sound, a light, a vibration or any combinations thereof, for example. In an embodiment of the invention, the control unit 114 of the cellular core unit 100 is configured to check the incoming connection indication settings of the peripheral unit 102, 104, with which the cellular core unit 100 has last been in LPRF connection 108, 110 and to indicate about the incoming connection request in the cellular core unit 100 according to the checked incoming connection indication settings of the peripheral unit 102,104. Thus, the cellular core unit's 100 ringing profile may be set according to settings of a peripheral unit 102, 104 that was last connected to the cellular core unit 100, for example. If the LPRF connection 108, 110 between one or more peripheral units 102, 104 becomes available again while the incoming connection request is being indicated in the cellular core unit 100, then the cellular core unit 100 stops ringing and the indications about the incoming call are transferred to one or more peripheral units 102, 104. Thus, when the cellular core unit 100 indicates the incoming call or message by tones, for example, the user may try to establish a connection to the cellular core unit 100 with one of the peripheral units 102, 104 and to receive the incoming call or a SMS message.

In an embodiment of the invention, the control unit 114 of the cellular core unit 100 is configured to transfer the indication of the incoming connection request to the peripheral unit 102, 104, if during the indication of the incoming connection request in the cellular core unit 100 the LPRF connection between the cellular core unit 100 and the peripheral unit 102, 104 becomes available.

In an embodiment of the invention, the control unit 114 of the cellular core unit 100 is configured to indicate the incoming connection request on the cellular core unit 100 also when during the indication on the incoming connection request to the peripheral unit 102,104 the LPRF connection 108, 110 between the cellular core unit 100 and the peripheral unit 102, 104 is lost.

It is possible that after establishing the incoming connection to a given peripheral unit 102, the user wishes to transfer the call to another peripheral unit 104, for example. Then the control unit 114 of the cellular core unit 100 is configured to receive a connection request from the other peripheral unit 104 than the peripheral unit 102 to which the incoming connection has been established and to transfer the established incoming connection from the peripheral unit 102 to which the incoming connection has already been established to the other peripheral unit 104 that has requested the connection.

When a headset 103, 105 is connected to the cellular core unit 100 or to any of the peripheral units 102, 104 an indication about the headset connection 106, 107 may appear on the screen of one or more peripheral units 102, 104, for example. It is possible that there are more than one headsets 103, 105 connected simultaneously to the cellular core unit 100 and to the peripheral units 102, 104 and then only indications of the given headset 103, 105 where audios of the incoming calls are to be routed are shown on the screen of the peripheral unit 102, 104. Thus, on the display of the peripheral unit 102, 104 a headset icon may be shown, for example. Accordingly, the control unit 114 of the cellular core unit 100 is then configured to indicate in one or more peripheral units 102, 104 if audios of the incoming connection are to be routed to the headset 103, 105 connected to a peripheral unit 102, 104 or to the cellular core unit 100.

As mentioned before, the peripheral units 102, 104 can each have their own profiles that can be changed independently in each peripheral unit. The incoming connection indication settings may be changed as desired by changing the profiles, for example. When the ringing mode of the peripheral unit 102, 104 is changed, the cellular core unit 100 is informed about the change. If the LPRF connection 108, 110 between the cellular core unit 100 and the peripheral unit 102, 104 to which the incoming call is to be established is lost when the incoming connection request is received in the cellular core unit 100, then the cellular core unit 100 informs about the incoming connection by using the ringing mode setting of the peripheral unit 102, 104 that last lost its LPRF connection 108, 110 to the cellular core unit 100. Thus, the cellular core unit's 100 profiles are set according to the last peripheral unit 102, 104 that has been connected to the cellular core unit 100. When there are peripheral units 102, 104 connected to the cellular core unit 100 the indications of the incoming calls and messages are indicated in the peripheral units 102, 104 according to their own settings. Otherwise, if there are not any peripheral units 102, 104 connected to the cellular core unit 100, the cellular core unit will indicate the incoming calls and messages according to the last peripheral unit's 102, 104 profile. The cellular core unit 100 changes its ringing tone and ringing volume information, for example, according to the last peripheral unit 102, 104. Thus, if the last peripheral unit's 102, 104 ringing mode is set to be silent, then the core unit 100 does not indicate the incoming calls and messages by sounds, for example, but perhaps only by lighting or vibration. The cellular core unit 100 may also comprise leds that will indicate incoming calls and messages by changing the lighting.

Figure 2:
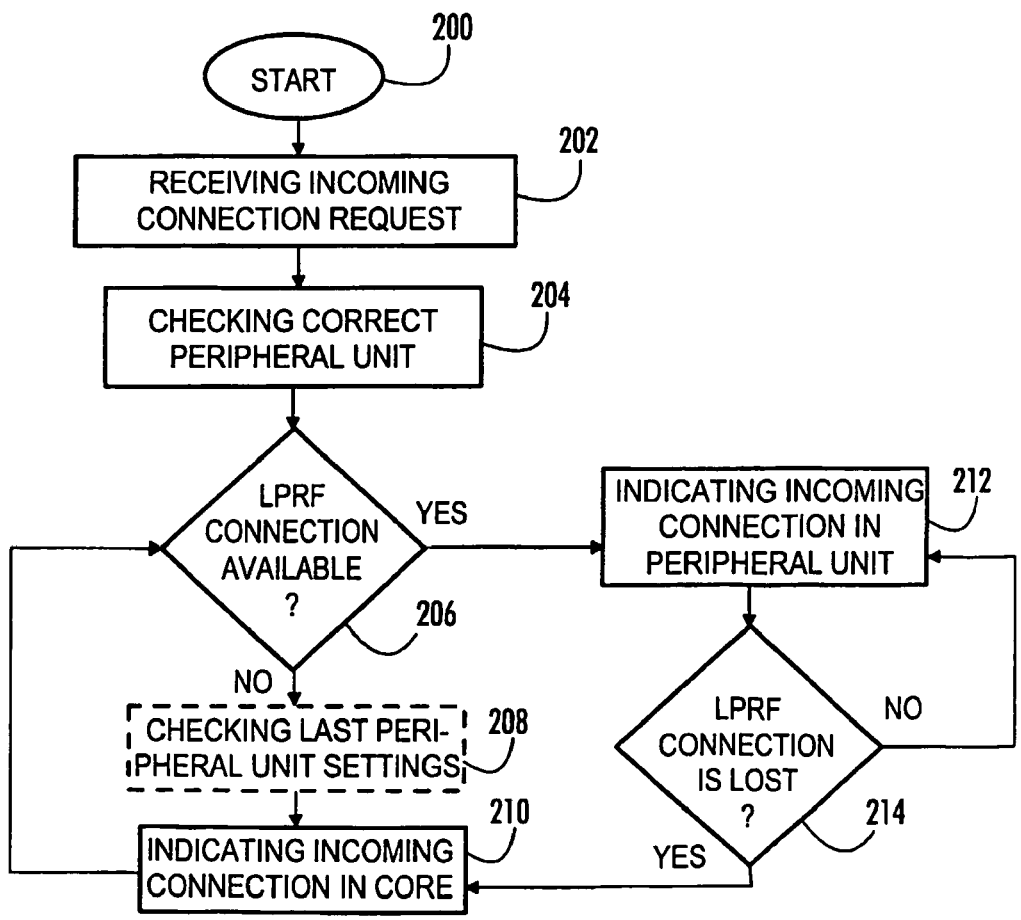
FIG. 2 shows an example of a method of indicating an incoming connection.

FIG. 2 shows an example of a method of indicating an incoming connection in the radio terminal equipment arrangement. The dashed lines illustrate alternative phases in the method. The method starts in 200. In 202, the incoming connection request is received from the cellular network by the cellular core unit of the radio terminal equipment arrangement. The incoming connection may be a call, a SMS message or a MMS message, for example. In 204, the core unit checks in which peripheral units the incoming connection request is to be indicated. In 206, it is detected whether the LPRF connection between the cellular core unit and the peripheral unit is available.

If in 206, it is detected that the LPRF connection between the cellular core unit and the peripheral unit is available, then 212 is entered where the incoming connection request is indicated in the peripheral unit but not in the cellular core unit.

However, in 206, if it is detected that the LPRF connection between the cellular core unit and the peripheral unit is not available, then 210 is entered where the incoming connection request is indicated in the core unit. In an embodiment of the invention, before entering 210, the method first checks in 208 the incoming connection indication settings of the last peripheral unit that has been in LPRF connection with the cellular core unit. Then in 210, the incoming connection request is indicated according to the checked incoming connection indication settings of the last peripheral unit.

If in 210, the LPRF connection between the cellular core unit and the peripheral unit becomes available again while indicating the incoming connection request in the cellular core unit, then the cellular core unit stops indicating and 212 is entered, where the incoming connection request is indicated in the peripheral unit instead. Correspondingly, if in 214, the LPRF connection between the cellular core unit and the peripheral unit is lost while indicating the incoming connection request in the peripheral unit in 212, then 210 is entered where the cellular core unit starts indicating the incoming connection request instead.

Figure 3:
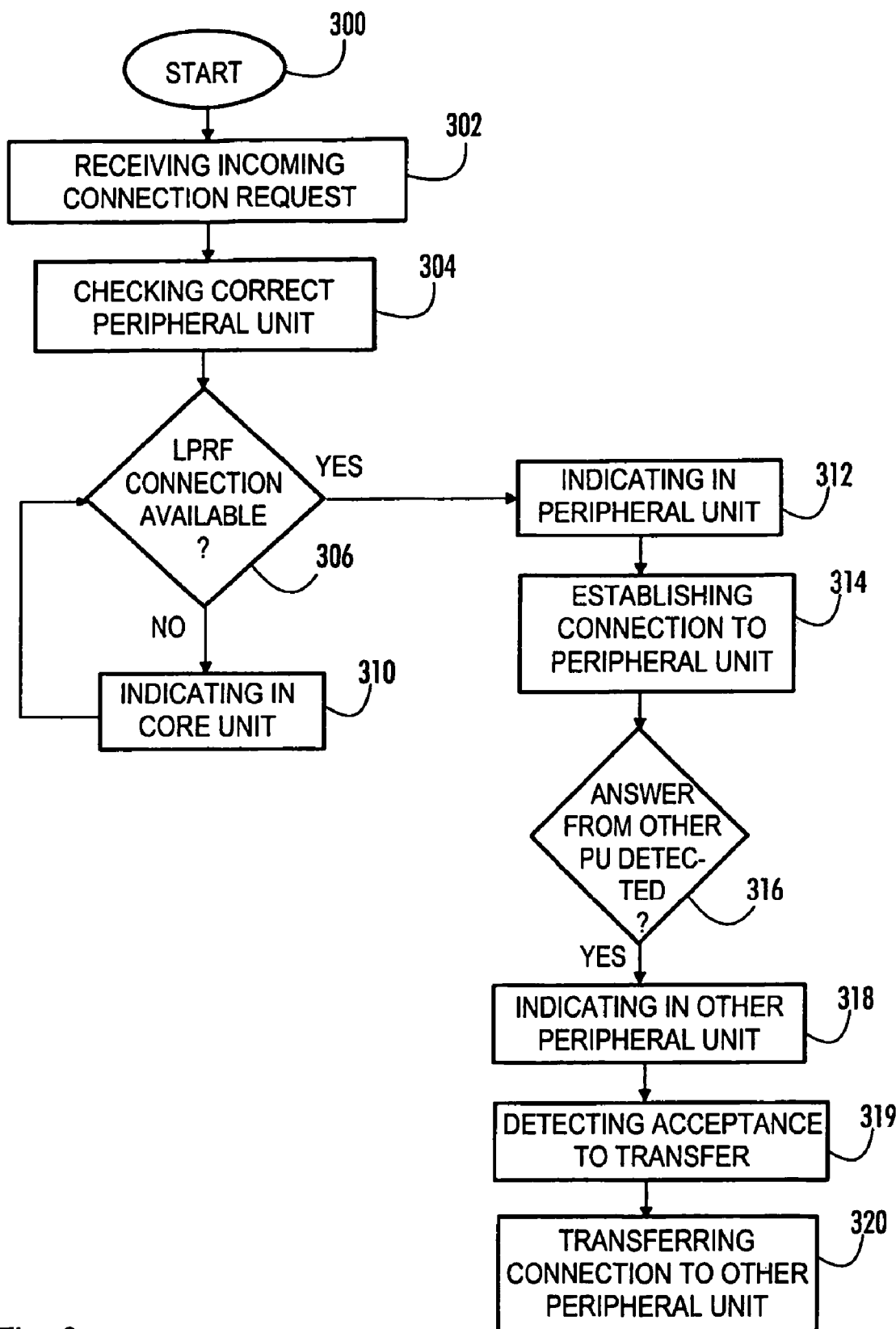
FIG. 3 shows another example of a method of indicating an incoming connection.

FIG. 3 shows another example of a method of indicating an incoming connection in the radio terminal equipment arrangement. The method starts in 300. First, in 302 and 304, an incoming connection request is received from the cellular network and the correct peripheral units are checked in which the incoming connection request is to be indicated. As in the example described in FIG. 2, it is next in 306 checked if the LPRF connection between the peripheral unit in which the incoming connection is to be indicated, and the core unit is available. If the LPRF connection is not available, then 310 is entered, where the incoming connection request is indicated in the core unit. If, in turn, the LPRF connection is available, then 312 is entered, where the incoming connection request is indicated in the peripheral unit.

In 314, the incoming connection, such as a phone call, is established to the peripheral unit. It is possible that after the call has been established, the user of the terminal needs to answer a phone call from another peripheral unit instead of the first peripheral unit to which the call has already been connected. Then, according to an embodiment of the invention, the established connection may be transferred to the other, what is known as the second peripheral unit. In 316, it is detected that a connection request from the second peripheral unit is received. The user may have pressed an answer key of the second peripheral unit, for example, and the pressing of the key may then have initiated the process of transferring the established connection to the second peripheral unit. Next, 318 is entered, where it is indicated in the second peripheral unit that the established connection is to be transferred to the second peripheral unit. It is possible that a pop-up window appears in the user interface of the second peripheral unit where it is requested whether the user wants to divert the connection to this peripheral unit. The user then accepts the transfer to take place by pressing a key of the second peripheral unit, for example. In 319, the cellular core unit detects the acceptance of the second peripheral unit to transfer the incoming connection. In 320, the connection is transferred from the first peripheral unit to which the incoming connection has already been established to the second peripheral unit that has requested the connection.

Figure 4:
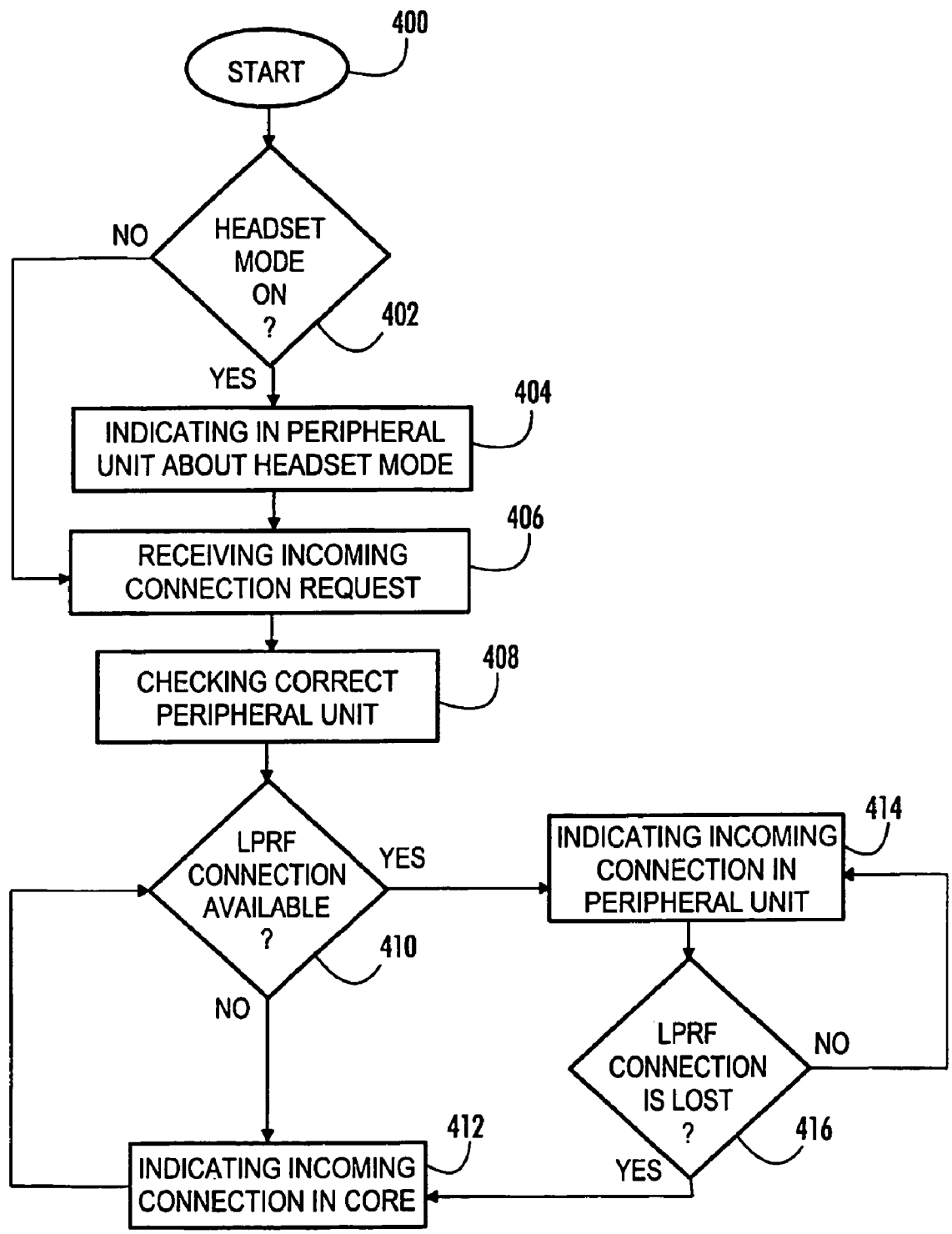
FIG. 4 shows yet another example of a method of indicating an incoming connection.

FIG. 4 shows yet another example of a method of indicating an incoming connection in the radio terminal equipment arrangement. In this example, a situation is described where a headset is connected to a peripheral unit or to the cellular core unit of the radio terminal equipment arrangement. The method starts in 400. In 402, it is detected whether the headset mode is turned on in the arrangement, i.e. whether the audios of the incoming calls are to be routed to the headset of the arrangement, for example. If the headset mode is turned on, then 404 is entered where it is indicated in one or more peripheral units that audios of the incoming connection are to be routed to a headset connected to a peripheral unit or to the cellular core unit. The information about the headset mode may comprise displaying a headset icon on the display of a peripheral unit, for example. Thus, the user will be informed about when the headset is connected to the radio terminal equipment arrangement and this information helps the user to understand that the audios are routed to the headset instead of the peripheral unit that is used to accept the incoming connection. When the headset is connected to the cellular core unit, it is possible that the user interface of the peripheral unit shows a textual or other indication that the audios are to be routed to the headset of the cellular core unit. It is possible that the information about the headset mode is shown in more than one peripheral unit. When the arrangement comprises multiple headsets, it is possible that the information about the headset mode includes information about to which particular headset the audios are to be routed. The information about the headset mode is carried out with specific messages over the LPRF connection between the cellular core unit and a peripheral unit, for example. After the peripheral unit has accepted the incoming connection, it is also possible that it is indicated by a textual information in the peripheral unit, if the audios of the incoming connection are routed to the headset connected to the cellular core unit.

After 404, the method proceeds to 406 and 408, where the incoming connection request is received from the cellular network by the cellular core unit and it is checked in which peripheral units the incoming connection request is to be indicated. In 410, it is detected whether the LPRF connection between the cellular core unit and the peripheral unit is available.

If in 410, it is detected that the LPRF connection between the cellular core unit and the peripheral unit is available, then 414 is entered where the incoming connection request is indicated in the peripheral unit but not in the cellular core unit. If the headset mode is turned on, then the information about the incoming connection may also be made in the headset connected to the arrangement. However, if it is detected in 410 that the LPRF connection between the cellular core unit and the peripheral unit is not available, then 412 is entered where the incoming connection request is indicated in the core unit. In an embodiment of the invention, before entering 412, the incoming connection indication settings of the last peripheral unit that has been in LPRF connection with the cellular core unit may first be checked. Then in 412, the incoming connection request is indicated according to the checked incoming connection indication settings of the last peripheral unit. If the headset mode is turned on, then 412 the indication about the incoming connection may be made in the headset connected to the cellular core unit, for example.

If in 412, the LPRF connection between the cellular core unit and the peripheral unit becomes available again while indicating the incoming connection request in the cellular core unit, then the cellular core unit may stop indicating and 414 is entered, where the incoming connection request is indicated in the peripheral unit instead. Correspondingly, if it is detected in 416 that the LPRF connection between the cellular core unit and the peripheral unit is lost while indicating the incoming connection request in the peripheral unit in 414, then 412 is entered again where the cellular core unit starts indicating the incoming connection request instead.

Even though the invention is described above with reference to an example according to the accompanying drawings, it is clear that the invention is not restricted thereto but it can be modified in several ways within the scope of the appended claims.

The invention claimed is:

1. A radio terminal equipment arrangement comprising:
a cellular core unit comprising:
a control unit for controlling the functions of the cellular core unit, the control unit being configured to communicate with a cellular network using a cellular connection, and to receive an incoming connection request from the cellular network; and
peripheral units being configured to communicate with the cellular core unit using a wireless low power radio frequency (LPRF) connection,
wherein:
the control unit of the cellular core unit is configured to indicate the incoming connection request in one or more peripheral units but not in the cellular core unit, when the LPRF connection between the cellular core unit and a peripheral unit is available;
the control unit of the cellular core unit is further configured to indicate the incoming connection request in the cellular core unit when the LPRF connection between the cellular core unit and the peripheral unit is not available, and to indicate the incoming connection request in the peripheral unit, when the LPRF connection between the cellular core unit and the peripheral unit becomes available; and
the control unit of the cellular core unit is further configured to establish an incoming connection to the peripheral unit in which the incoming connection request has been accepted, to receive a connection request from another peripheral unit than the peripheral unit to which the incoming connection has been established, to indicate in the other peripheral unit about transferring the connection to the other peripheral unit, and to transfer the established incoming connection from the peripheral unit to which the incoming connection has already been established to the other peripheral unit that has requested the connection.

2. The arrangement of claim 1, wherein the control unit of the cellular core unit is configured to transfer the indication of the incoming connection request to the peripheral unit, when during the indication of the incoming connection request in the cellular core unit the LPRF connection between the cellular core unit and the peripheral unit becomes available.

3. The arrangement of claim 1, wherein the control unit of the cellular core unit is configured to check the incoming connection indication settings of the peripheral unit with which the cellular core unit has last been in LPRF connection and to indicate about the incoming connection request in the cellular core unit according to the checked incoming connection indication settings of the peripheral unit.

4. The arrangement of claim 1, wherein the control unit of the cellular core unit is configured to indicate about the incoming connection request on the cellular core unit by signalling with a sound, a light or a vibration.

5. The arrangement of claim 1, wherein the control unit of the cellular core unit is configured to indicate the incoming connection request on the cellular core unit, when during the indication concerning the incoming connection request to the peripheral unit the LPRF connection between the cellular core unit and the peripheral unit is lost.

6. The arrangement of claim 1, wherein the arrangement further comprises a headset connected to the peripheral unit or to the cellular core unit and the control unit is further configured to indicate in the peripheral unit if audios of the incoming connection are to be routed to the headset.

7. The arrangement of claim 1, wherein the arrangement further comprises a headset connected to the cellular core unit, the peripheral unit is configured to accept the incoming connection and the control unit is configured to indicate in the peripheral unit when the audios of the incoming connection are routed to the headset connected to the cellular core unit.

8. The arrangement of claim 1, wherein the LPRF connection between the cellular core unit and the peripheral unit is a Bluetooth or a WLAN connection.

9. A method of indicating about an incoming connection in a radio terminal equipment arrangement comprising: a cellular core unit and one or more peripheral units, the cellular core unit communicating with one or more of the peripheral units using a wireless low power radio frequency (LPRF) connection, the method comprising:
receiving an incoming connection request from a cellular network by the cellular core unit;
indicating the incoming connection request in one or more of the peripheral units but not in the cellular core unit, when the LPRF connection between the cellular core unit and one or more of the peripheral units is available;
indicating about the incoming connection request in the cellular core unit, when the LPRF connection between the cellular core unit and the peripheral unit is not available;
indicating about the incoming connection request in the peripheral unit, when the LPRF connection between the cellular core unit and the peripheral unit becomes available;
establishing an incoming connection to the peripheral unit in which the incoming connection request has been received;
receiving a connection request from another peripheral unit;
indicating in the other peripheral unit about transferring the connection to the other peripheral unit; and
transferring the established incoming connection from the peripheral unit to the other peripheral unit.

10. The method of claim 9, the method comprising transferring the indication of the incoming connection request to the peripheral unit, when during the indication of the incoming connection request in the cellular core unit the LPRF connection between the cellular core unit and the peripheral unit becomes available.

11. The method of claim 9, the method comprising checking the incoming connection indication settings of a peripheral unit with which the cellular core unit has last been in connection with and indicating about the incoming connection request in the cellular core unit according to the checked incoming connection indication settings of the peripheral unit.

12. The method of claim 9, the method comprising indicating about the incoming connection request in the cellular core unit by signalling with a sound, a light or a vibration.

13. The method of claim 9, the method comprising indicating about the incoming connection in the cellular core unit, when during the indication concerning the incoming connection request to the peripheral unit the LPRF connection between the cellular core unit and the peripheral unit is lost.

14. The method of claim 9, the method further comprising indicating in the peripheral unit when audios of the incoming connection are to be routed to a headset connected to the peripheral unit or to the cellular core unit.

15. The method of claim 9, the method further comprising accepting the incoming connection in the peripheral unit and indicating in the peripheral unit, when the audios of the incoming connection are routed to a headset connected to the cellular core unit.

16. The method of claim 9, wherein the LPRF connection between the cellular core unit and the peripheral unit is a Bluetooth or a WLAN connection.

* * * * *